United States Patent
Alhassan et al.

(10) Patent No.: US 11,679,989 B2
(45) Date of Patent: Jun. 20, 2023

(54) MECHANO-THERMAL PREPARATION OF ZINC SULFIDE NANOPARTICLES

(71) Applicant: KHALIFA UNIVERSITY OF SCIENCE AND TECHNOLOGY, Abu Dhabi (AE)

(72) Inventors: Saeed Alhassan, Abu Dhabi (AE); Sunil P. Lonkar, Abu Dhabi (AE)

(73) Assignee: KHALIFA UNIVERSITY OF SCIENCE AND TECHNOLOGY, Abu Dhabi (AE)

(*) Notice: Subject to any disclaimer, the term of this patent is extended or adjusted under 35 U.S.C. 154(b) by 760 days.

(21) Appl. No.: 16/495,630

(22) PCT Filed: Mar. 21, 2017

(86) PCT No.: PCT/IB2017/051634
§ 371 (c)(1),
(2) Date: Sep. 19, 2019

(87) PCT Pub. No.: WO2018/172813
PCT Pub. Date: Sep. 27, 2018

(65) Prior Publication Data
US 2020/0109060 A1    Apr. 9, 2020

(51) Int. Cl.
*C01G 9/08* (2006.01)

(52) U.S. Cl.
CPC ............ *C01G 9/08* (2013.01); *C01P 2004/64* (2013.01)

(58) Field of Classification Search
None
See application file for complete search history.

(56) References Cited

U.S. PATENT DOCUMENTS

| | | | | |
|---|---|---|---|---|
| 3,317,145 A | * | 5/1967 | Stephanoff | C09C 3/006 |
| | | | | 34/368 |
| 4,340,839 A | * | 7/1982 | Fujita | C04B 35/547 |
| | | | | 313/466 |
| 6,017,425 A | * | 1/2000 | Park | B01J 35/004 |
| | | | | 204/157.52 |
| 2010/0310871 A1 | * | 12/2010 | McCormick | A61Q 17/04 |
| | | | | 423/622 |

FOREIGN PATENT DOCUMENTS

| | | | |
|---|---|---|---|
| CN | 1613750 A | | 5/2005 |
| CN | 1851009 A | | 10/2006 |
| CN | 101249982 A | | 8/2008 |
| CN | 101792931 | * | 8/2010 |
| CN | 101792931 A | | 8/2010 |
| CN | 104831063 | * | 8/2015 |
| WO | 0134723 | * | 5/2001 |

OTHER PUBLICATIONS

Qadri, et al. "Size induced transition temperature reduction in nanoparticles of ZnS". Physical REview B. Condensed Matter and Materials Physics. 13. 60. Oct. 1999. (Year: 1999).*
Office Action issued by the Chinese Patent Office in connection with application No. 201780088608.6 dated Oct. 11, 2021.
International Search Report dated Dec. 6, 2018 in PCT/IB2017/051634.
Bing, et. al., "Catalysis science and technology in new century Collection of papers of the tenth nationwide catalysis academic conference," Shanxi Science and Technology Press,Oct. 2000 Zhangjiajie.
Weibao, et. al., "Rock and Mineral Analysis," Hunan Institute of test and utilization of mineral resources, Apr. 1988.
China Notification of the Second Office Action in connection to Application No. 2017800886086 and dated Apr. 26, 2022.

* cited by examiner

*Primary Examiner* — Sheng H Davis
(74) *Attorney, Agent, or Firm* — Dennemeyer & Associates LLC

(57) ABSTRACT

A method for preparing zinc sulfide particles is described which comprising the steps (i) preparing a mixture of zinc mineral and elemental sulfur, (ii) milling the mixture obtained in step (i), and (iii) annealing the mixture obtained in step (ii) at a temperature ranging from 300 to 500° C. to obtain zinc sulfide particles.

11 Claims, No Drawings

MECHANO-THERMAL PREPARATION OF ZINC SULFIDE NANOPARTICLES

CROSS-REFERENCE TO RELATED APPLICATIONS

This application is a 35 USC 371 National Stage Patent Application and claims priority to International Application No. PCT/IB2017/051634 filed Mar. 21, 2017, which is hereby incorporated by reference in its entirety.

The present invention refers to a method for preparing zinc sulfide particles, more specifically zinc sulfide nanoparticles. The invention is especially directed to a mechano-thermal method for preparing zinc sulfide particles, especially zinc sulfide nanoparticles.

BACKGROUND

Zinc sulfide is an important II-VI semiconductor material. Owing to its wide band gap of 3.77 eV, excitation binding energy (40meV), higher than room temperature thermal energy (26 emV), optical transparency to infrared (IR) and excellent chemical and thermal stability makes it an ideal material for the production of UV/blue light emitting device, infrared window material in thermal imaging and aerospace applications. Its high electroluminescence and photoluminescence properties are vital in the field of electronics. ZnS is also an active photocatalyst for photocatalytic water splitting in hydrogen energy generation and photoreduction of CO2 and dehalogenation of halogenated aromatics.

O. Kozak et al. (Chalcogenide Letters Vol. 9, No. 10, October 2012, P. 413-419) describe a process by which ZnS nanoparticles can be synthesized by precipitation reaction of zinc and sulphide ions in an aqueous media and through the use of a stabilizing agent. The aqueous media is stabilized by cetyltrimethylammonium bromide (CTAB). The used reactants were reagent grade: Zinc acetate and sodium sulphide. The ZnS nanoparticles were prepared in the presence of CTAB. The aqueous solution of Na2S and CTAB (solution A) was added to a stirred aqueous solution of zinc acetate (solution B).

A. Dumbrava et al. (Rom. Journ. Phys., Vol. 50, Nos. 7-8, P. 831-836) describe a method which utilizes thiourea and sodium palmitate mixed in an aqueous solution containing $Zn(CH_3COO)_2 \cdot 2H_2O$ (zinc acetate dihydrate). The resulting mixture is heated under continuous stirring and a white precipitate results which is separated. The precipitated is the isolated by vacuum filtration, washed with water and dried.

C. S. Pathak et al. (Physica B: Condensed Matter Volume 407, Issue 17, 1 September 2012, Pages 3309-3312) describe a method which is a mechano-chemical route for preparation of ZnS nanoparticles. Zinc acetate and sodium sulphide are used as the source materials and combined in a high energy planetary ball mill at rotation speed of 300 rpm and vial rotation speed of 600 rpm with ball to powder (BPR or charge ratio CR) 5:1 for 30 and 90 min. The milled powder are the washed with methanol to remove any impurities. The powder is then dried at 300° C. The crystallite size of the synthesized ZnS nanoparticles is found to be in the range 7-8 nm (calculated using Debye-Scherer's formula).

Further known methods for producing ZnS nanoparticles are summarized in the following table:

| Ref. | Methods | Zinc Source | Sulfur source and surfactant | Particle size (nm) |
|---|---|---|---|---|
| CN103910379A | CVD | Powdered zinc | $CS_2/H_2S$ | 20 nm |
| CN1821082 A | Radio-chemical | Zinc Sulfate | Sodium thiosulfate | 20 nm |
| CN100410177 C | High pressure fluid mill | Zinc acetate | Thioacetamide | |
| [1] | Ultra sonic | Zinc metal | Sodium sulfide | 40 nm |
| US8426817 B2 | Co-Precipitation | Zinc chloride/Zinc nitrae | Sodium sulfide | 40 |
| [2] | Hydrothermal | Zinc sulfate | Sodium sulfide | 15-30 |
| CN101249982 B | Hydrothermal | Zinc nitrate | Sodium sulfate | 20 |
| [3] | Solid phase | Zinc acetate | Thioacetamide | 40 nm |
| [4, 5] | Biosynthesis | Zinc sulfate | Bacterial Sulfide | 40 nm |
| [6] | Solvothermal | Zinc acetate | Sodium sulfide, ethylene glycol, CTAB | 29-40 nm |
| [7] | Mechano-chemical | Zinc acetate | Sodium sulfide | 5-7 nm (XRD) |
| [8] | High gravity method | Zinc nitrate | Hydrogen sulfide | |

[1] J. F. Xu et al., Appl. Phys. A 66, 639-641 (1998)
[2] T. T. Q. Hoa et al., Journal of Physics: Conference Series 187 (2009) 012081
[3] L. P. Wang et al., Materials Research Bulletin 35 (2000) 695-701
[4] C. Hazra et al., J Chem Technol Biotechnol 2013; 88: 1039-1048
[5] S. Mirzadeh et al., Materials Science in Semiconductor Processing 16 (2013) 374-378
[6] D. Mishra et al., Indian Journal of Chemistry, Vol. 52A, December, 2013, 1591-1594
[7] C. S. Pathak et al., Superlattices and Microstructures 58 (2013) 135-143
[8] J. Chen et al., Materials Research Bulletin 39 (2004) 185-194

The known methods employed in multidimensional ZnS nanostructures preparation include a solution method, a sol-gel method, chemical vapor deposition method and physical mixing method. Most of these techniques use synthetic zinc precursors or compounds, which are usually toxic and hazardous chemical agents, and sometimes also high cost surfactants. Further, uneven particle sizes, impurities and defects as well as a requirement for complex purification methods are frequently encountered major shortcomings.

Therefore, to meet the practical needs, the development a simple and scaleable route for the straightforward preparation of homogeneous zinc sulfide nanoparticles has important scientific value and practical significance.

SUMMARY OF THE INVENTION

It is an object of the present invention to provide a simple method for preparing zinc sulfide particles, also referred to herein as zinc sulfide nanoparticles.

It is also an object of the present invention that the method for preparing zinc sulfide particles allows an easy scale-up.

It is a further object of the present invention that the method for preparing zinc sulfide particles is environmental-friendly and non-toxic.

It is likewise an object of the present invention that the method for preparing zinc sulfide particles can be carried out at low costs.

Another object of the present invention is to provide zinc sulfide particles which can be obtained via an advantageous method as described herein.

In order to achieve one or more of the mentioned objects, the present invention provides a method for preparing zinc sulfide particles comprising the steps:
(i) preparing a mixture of zinc mineral and elemental sulfur,
(ii) milling the mixture obtained in step (i), and (iii) annealing the mixture obtained in step (ii) at a temperature ranging from 300 to 500° C. to obtain zinc sulfide particles.

According to a preferred embodiment, the zinc mineral is hydrozincite.

It is further preferred that the milling of step (ii) is carried out until the mixture obtained in step (i) is homogenized and/or that the milling of step (ii) is carried out using a vortex ball mill.

In the methods of this invention it is further preferred that the weight ratio of zinc mineral to sulfur ranges from 1:0.25 to 1:1 wt. %, and/or that the zinc sulfide particles obtained in step (iii) have an average particle size of 20 nm or below 20 nm.

In a particular preferred embodiment, the method according to the invention is carried out in the absence of any solvents including water, i.e. that the method is a dry method. Likewise, it is also preferred that the method according to the invention is carried out in the absence of any surfactants, stabilizers or other additives.

In a further preferred embodiment step (iii) of the method according to the present invention is carried out under inert atmosphere, preferably under nitrogen atmosphere or argon atmosphere.

In order to achieve one or more of the mentioned objects, the present invention further provides zinc sulfide particles which are obtainable by a method according to the present invention.

DETAILED DESCRIPTION OF THE INVENTION

This invention relates to a method for preparing zinc sulfide nanoparticles, more particularly to a mechano-thermal method for large scale production of zinc sulfide nanoparticles. The method for preparing zinc sulfide particles according to the present invention therefore comprises the steps of
(i) preparing a mixture of zinc mineral and elemental sulfur,
(ii) milling the mixture obtained in step (i), and
(iii) annealing the mixture obtained in step (ii) at a temperature ranging from 300 to 500° C. to obtain zinc sulfide particles. This simple solvent free method uses a naturally occurring zinc precursor and a highly abundant, low cost sulfur source. No toxic solvents and surfactants are used to control the particle size. The method is highly feasible for large scale production with minimal complexity. The present invention also achieves the object to provide a method that uses mechanical and thermal energy to produce zinc sulfide nanoparticles.

The following points underline the advantages of the present invention:
1. Solvent free mechano-thermal synthesis.
2. Use of natural and abundant low cost starting materials.
3. No further purification required for the resulting ZnS nanoparticles.
4. No use of surfactant or capping agent to control the particle size, i.e. the process is operable without the necessity for solvents or surface capping agents to control the particle size.
5. The process can be scaled-up easily.

The use of sulfur in an immediate application as in the present invention, i.e. the use of the element as is, creates a promising use for the abundant chemical sulfur which is increasingly becoming a major issue for the industry.

Additionally, the method according to the invention provides a process of making an existing material via a different and more direct route. In particular, the method according to the invention is a ZnS synthesis method that uses mechanical and thermal energy to produce zinc sulfide nanoparticles. It is believed that companies that would be interested are those that are currently using ZnS in their applications and also companies that are already making ZnS who might find this process more practical to switch to.

In the present invention the term "mineral" is used as common in the art. For example, a mineral can be defined as follows: Minerals are naturally-occurring inorganic substances with a definite and predictable chemical composition and physical properties. According to a preferred embodiment, the used zinc mineral is hydrozincite ($Zn_5(CO_3)_2(OH)_6$) because it is a naturally occurring and low cost starting material.

According to a preferred process variant, the milling of step (ii) is carried out until the mixture obtained in step (i) is homogenized which allows for a more predictable and reliable way of obtaining the desired zinc sulfide particles. For the milling of a mixture of a zinc mineral with elemental sulfur the use of a vortex ball mill for the milling of step (ii) has the advantage of a quick milling without loss of substance adhering to mill components.

Particularly good results in terms of process efficiency have been obtained when a preferred weight ratio of zinc mineral to sulfur was in the range of from 1:0.25 to 1:1 wt. %.

In the present invention, it is preferred that the zinc sulfide particles obtained in step (iii) have an average particle size of 20 nm or below 20 nm in order to give the desired nano-sized powder.

It is further preferred that the method according to the invention is carried out in the absence of any solvents including water, i.e. that the method is a dry method. This avoids any formation of clumps and saves costs as no solvents are required which is moreover environmental-friendly.

It is also preferred for the present invention that the inventive method is carried out in the absence of any surfactants, stabilizers or other additives. The present invention does not require any of such additives in order to form ZnS nano-particles in a reliable manner so that no additional costs for such additives are created, and again the method is thereby particularly environmental-friendly.

In order to avoid the formation of any oxides and thus in order to obtain particularly pure zinc sulfide particles it is further preferred according to the invention that step (iii) of the inventive method is carried out under inert atmosphere, preferably under nitrogen atmosphere or argon atmosphere.

The present invention further provides zinc sulfide particles which are obtainable by a method according to the present invention, i.e. zinc sulfide particles which can be produced at low costs in a speedy and reliable manner.

The present invention for the first time allows to prepare zinc sulfide nanoparticles using naturally occurring zinc precursors and to use mechanical and thermal energy, as well as to achieve effective control of nanoscopic particle size, resulting in a uniform dispersion of ZnS nanoparticles. Therefore, advantages of the present invention are: 1) Preparation uses naturally occurring and very cheap raw materials and low toxicity, low cost, safety; 2) Preparation process is solvent free and does not add any surfactant, stabilizer and other additives; 3) Production of zinc sulfide nanoparticles with small and uniform size distribution and good dispersion and stability; 4) Process has high reaction rate and large scale, continuous production can be achieved under industrial production conditions.

Working Example

The following preparation processes and procedures were used: A weighed amount of zinc salt which is naturally occurring zinc mineral (hydrozincite; chemical formula: $Zn_5(CO_3)_2(OH)_6$) and elemental sulfur were homogenized under vortex ball mill using different reactants to ball weight ratio, and then the mixture was thermally annealed under inert atmosphere at temperature ranging from 300 to 500° C. The weight ratio of zinc salt and sulfur was varied between 1:0.25 to 1:1 wt-%. to finally obtain the nano-sized zinc sulfide as an off-white powder. This resulted into ZnS particles having an average particle size of sub-20 nm.

This mechano-thermal method of ZnS nanoparticle production does not use any catalyst, surface capping agent, solvent or further purification process and is carried out under effect of moderate thermal energy. The process of the present method is simple, one-step and highly suitable for large scale production of zinc sulfide nanoparticles.

The invention claimed is:

1. A method for preparing zinc sulfide particles comprising the steps:
   (i) preparing a mixture of zinc mineral and elemental sulfur,
   (ii) milling the mixture obtained in step (i), and
   (iii) annealing the mixture obtained in step (ii) at a temperature ranging from 300 to 500° C. to obtain zinc sulfide particles,
   wherein the zinc mineral is hydrozincite.

2. The method according to claim 1, wherein the milling of step (ii) is carried out until the mixture obtained in step (i) is homogenized.

3. The method according to claim 1, wherein the milling of step (ii) is carried out using a vortex ball mill.

4. The method according to claim 1, wherein weight ratio of zinc mineral to sulfur ranges from 1:0.25 wt. % to 1:1 wt. %.

5. The method according to claim 1, wherein the zinc sulfide particles obtained in step (iii) have an average particle size of 20 nm or below 20 nm.

6. The method according to claim 1, which is carried out in the absence of any solvents including water so that it is a dry method.

7. The method according to claim 1, which is carried out in the absence of any surfactants, stabilizers or other additives.

8. The method according to claim 1, wherein step (iii) is carried out under inert atmosphere.

9. Zinc sulfide particles, obtainable by a method according to claim 1.

10. The method according to claim 1 wherein step (iii) is carried out under nitrogen atmosphere.

11. The method according to claim 1 wherein step (iii) is carried out under argon atmosphere.

* * * * *